United States Patent
Matsuda et al.

(10) Patent No.: US 10,082,198 B2
(45) Date of Patent: Sep. 25, 2018

(54) LOCK-UP DEVICE FOR TORQUE CONVERTER

(71) Applicant: EXEDY Corporation, Neyagawa-shi, Osaka (JP)

(72) Inventors: Satoru Matsuda, Neyagawa (JP); Mitsuru Kuwahata, Neyagawa (JP)

(73) Assignee: EXEDY CORPORATION, Neyagawa-shi, Osaka (JP)

( * ) Notice: Subject to any disclaimer, the term of this patent is extended or adjusted under 35 U.S.C. 154(b) by 0 days.

(21) Appl. No.: 15/492,304

(22) Filed: Apr. 20, 2017

(65) Prior Publication Data

US 2017/0328454 A1  Nov. 16, 2017

(30) Foreign Application Priority Data

May 16, 2016  (JP) .................................. 2016-097938

(51) Int. Cl.
| | | |
|---|---|---|
| *F16H 45/02* | (2006.01) | |
| *F16D 13/40* | (2006.01) | |
| *F16D 25/0635* | (2006.01) | |
| *F16H 41/24* | (2006.01) | |

(52) U.S. Cl.
CPC ............. *F16H 45/02* (2013.01); *F16D 13/40* (2013.01); *F16D 25/0635* (2013.01); *F16H 41/24* (2013.01); *F16H 2045/0215* (2013.01)

(58) Field of Classification Search
None
See application file for complete search history.

(56) References Cited

U.S. PATENT DOCUMENTS

| | | | | |
|---|---|---|---|---|
| 5,669,474 A | * | 9/1997 | Dehrnnann | ............. F16H 45/02 192/107 R |
| 2007/0007095 A1 | * | 1/2007 | Tsukamoto | ......... F16D 25/0638 192/3.29 |
| 2014/0262666 A1 | * | 9/2014 | Ushio | ..................... F16H 45/02 192/3.29 |

FOREIGN PATENT DOCUMENTS

JP        2004270808 A        9/2004

* cited by examiner

*Primary Examiner* — Huan Le
*Assistant Examiner* — Lori Wu
(74) *Attorney, Agent, or Firm* — United IP Counselors, LLC

(57) ABSTRACT

A lock-up device for a torque converter transmits a torque from a front cover to an input shaft of a transmission. The lock-up device includes a clutch portion, a piston and hydraulic oil leading-out portion. The clutch portion is disposed between the front cover and a turbine, and includes at least one clutch plate. The piston is disposed to be axially movable and presses the at least one clutch plate toward the front cover so as to turn the clutch portion into a torque transmitting state. The hydraulic oil leading-out portion is mounted to a piston-side lateral surface of the front cover, and leads a hydraulic oil residing between the front cover and the piston to an oil discharge channel provided in the input shaft of the transmission by utilizing rotation of the front cover.

6 Claims, 4 Drawing Sheets

LOCK-UP DEVICE FOR TORQUE CONVERTER

CROSS-REFERENCE TO RELATED APPLICATIONS

This application claims priority to Japanese Patent Application No. 2016-097938 filed on May 16, 2016, the entirety of which is hereby incorporated by reference in its entirety.

BACKGROUND

Technical Field

The present disclosure relates to a lock-up device, and particularly to a lock-up device for a torque converter, which transmits a torque from a front cover to an input shaft of a transmission.

Background Information

Torque converters are often equipped with a lock-up device that directly transmits a torque from a front cover to an input shaft of a transmission through a turbine. Such a lock-up device includes a piston, an input-side plate, a plurality of torsion springs, and an output-side plate. The piston is capable of being coupled by friction to the front cover. The input-side plate is fixed to the piston. The torsion springs are supported by the input-side plate. The output-side plate is elastically coupled through the torsion springs to the piston and the input-side plate in a rotational direction. The output-side plate is fixed to the turbine.

Additionally, as described in Japan Laid-open Patent Application Publication No. 2004-270808, there has been also proposed a type of lock-up device using a plurality of clutch plates to increase its clutch capacity. In the lock-up device described in Japan Laid-open Patent Application Publication No. 2004-270808, the plural clutch plates are disposed between the piston and a clutch input member fixed to the front cover.

In some lock-up devices including the one described in Japan Laid-open Patent Application Publication No. 2004-270808, a space between the piston and the front cover is connected to a drain when a lock-up state (clutch-on state) as a torque transmitting state is made. In other words, hydraulic oil residing in the space between the piston and the front cover is discharged from the center part of the front cover to a hydraulic oil tank through an oil channel provided in the interior of the input shaft of the transmission. Then, the hydraulic pressure on the turbine side of the piston increases, whereby the piston is moved toward the front cover. Accordingly, the clutch plates are interposed and held between the piston and the front cover, whereby the lock-up state is made.

In the lock-up state described above, the hydraulic pressure on the turbine side of the piston (applying pressure) and that on the front cover side of the piston (releasing pressure) increase with increase in rotational speed. However, the inventors of the present application found that pressure difference between the applying pressure and the releasing pressure reduces with increase in rotational speed. When the pressure difference between the applying pressure and the releasing pressure reduces with increase in rotational speed as described above, malfunction occurs that the torque transmission capacity (i.e., lock-up capacity) of the lock-up device reduces with increase in rotational speed.

BRIEF SUMMARY

It is an object of the present disclosure to inhibit reduction in torque transmission capacity (lock-up capacity) with increase in rotational speed in, especially, a type of lock-up device that actuates a piston by difference between pressures on both sides of the piston, i.e., pressure difference between an applying pressure and a releasing pressure.

(1) A lock-up device for a torque converter according to the present disclosure transmits a torque from a front cover to an input shaft of a transmission. The lock-up device includes a clutch portion, a piston and hydraulic oil leading-out means. The clutch portion is disposed between the front cover and a turbine, and includes at least one clutch plate. The piston is disposed to be axially movable, and presses the at least one clutch plate toward the front cover so as to turn the clutch portion into a torque transmitting state. The hydraulic oil leading-out means is means for leading a hydraulic oil residing between the front cover and the piston to an oil discharge channel provided in the input shaft of the transmission by utilizing rotation of the front cover, and is mounted to a piston-side lateral surface of the front cover.

In the present lock-up device, when the front cover is rotated, the hydraulic oil leading-out means mounted to the lateral surface of the front cover leads the hydraulic oil residing between the front cover and the piston to the oil discharge channel provided in the input shaft of the transmission. The hydraulic oil, led to the oil discharge channel, is drained to a hydraulic oil tank.

The hydraulic oil, residing between the front cover and the piston, is herein actively led to the oil discharge channel. Hence, a releasing pressure can be inhibited from increasing with increase in rotational speed. Therefore, reduction in pressure difference between an applying pressure and the releasing pressure can be inhibited even in increase in rotational speed. As a result, reduction in lock-up capacity with increase in rotational speed can be inhibited.

(2) The hydraulic oil leading-out means may be mounted to a center part of the front cover in opposition to a tip surface of the input shaft of the transmission. In this construction, the hydraulic oil, residing between the front cover and the piston, can be efficiently led to the oil discharge channel of the input shaft.

(3) The hydraulic oil leading-out means may be a plate member fixed to the center part of the front cover, and may include a leading-out part leading the hydraulic oil to the oil discharge channel.

Alternatively, the hydraulic oil leading-out means can be herein integrated with the front cover. However, when the hydraulic-oil leading-out means is integrated with the front cover, manufacturing of the front cover possibly becomes complex depending on the structure of the hydraulic oil leading-out means, and this may result in increase in manufacturing cost.

In view of this, it is preferable to provide, separately from the front cover, a plate member composing the hydraulic oil leading-out means. In this construction, it is only required to perform processing to fix the plate member to the front cover. Hence, increase in manufacturing cost of the front cover can be avoided. Additionally, it is possible to easily contend with a variety of specifications and alternation of conditions by variously changing the shape and/or so forth of the plate member.

(4) The plate member may include a plurality of holes axially penetrating therethrough as the leading-out part, and the plurality of holes may radially extend from a center part of the plate member. Additionally, the hydraulic oil may be taken into the plurality of holes and be led to the oil discharge channel in conjunction with the rotation of the front cover.

In this construction, the hydraulic oil can be led to the oil discharge channel only by forming the holes in the plate member. Additionally, with the simple construction, the hydraulic oil can be efficiently discharged and reduction in lock-up capacity can be inhibited.

(5) The plate member may include a plurality of elongated grooves axially penetrating therethrough as the leading-out part, and the plurality of elongated grooves may radially extend from an inner peripheral part of the plate member and may be opened to an outer peripheral side. Additionally, the hydraulic oil may be taken into the plurality of elongated grooves and be led to the oil discharge channel in conjunction with the rotation of the front cover.

In this construction, similarly to the aforementioned construction, the hydraulic oil can be led to the oil discharge channel only by forming the holes in the plate member. Additionally, with the simple construction, the hydraulic oil can be effectively discharged and reduction in lock-up capacity can be inhibited.

(6) The front cover may include a recess that is provided on the piston-side lateral surface thereof in opposition to the tip surface of the input shaft of the transmission. Additionally, the plate member may be disposed in the recess such that a surface thereof opposed to the input shaft does not protrude beyond the piston-side lateral surface of the front cover.

Now, chances are that in assemblage of the input shaft of the transmission to the torque converter, the tip of the input shaft is temporarily located closer to the front cover than in completion of the assemblage, and is then set in place. Employment of such an assemblage method bears the possibility that the tip of the input shaft interferes with the plate member when the plate member protrudes beyond the surface of the front cover.

In view of this, when the plate member is fixed to the front cover, it is preferable to dispose the plate member in the recess of the front cover such that the plate member does not protrude beyond the lateral surface of the front cover.

(7) The torque converter may include a torque converter body and a hydraulic oil supply channel. The torque converter body includes an impeller, a turbine and a stator. The hydraulic oil supply channel supplies the hydraulic oil from an inner peripheral part of the torque converter body to a space that is disposed on a transmission side of the piston and includes the torque converter body.

Drawbacks of the present disclosure are likely to occur in such so-called two-port torque converters equipped with a lock-up device. In other words, when employing the present disclosure, the two-port torque converters equipped with a lock-up device can inhibit reduction in lock-up capacity as effectively as possible.

(8) The clutch portion may include at least one first clutch plate, at least one second clutch plate and a plurality of friction members. The plurality of friction members are fixed to the first clutch plate or the second clutch plate. Additionally, the plurality of friction members may each include a groove provided thereon to penetrate therethrough from an outer peripheral side to an inner peripheral side.

Now, according to findings of research by the inventors of the present disclosure, it was revealed that a phenomenon of reduction in pressure difference between the applying pressure and the releasing pressure with increase in rotational speed is affected by the magnitude of the cross-sectional area of a lubricating groove provided on each friction member to penetrate therethrough from the outer peripheral side to the inner peripheral side. Additionally, it was also revealed that a multi-plate clutch portion including a plurality of clutch plates is greatly affected by the magnitude of the cross-sectional area of the lubricating groove.

In view of this, when employing the present disclosure, the lock-up devices including the clutch portion described above can inhibit reduction in lock-up capacity as effectively as possible.

Overall, according to the present disclosure described above, reduction in lock-up capacity with increase in rotational speed can be inhibited in a type of lock-up device that actuates a piston by difference between pressures on both sides of the piston, i.e., pressure difference between an applying pressure and a releasing pressure.

BRIEF DESCRIPTION OF THE DRAWINGS

Referring now to the attached drawings which form a part of this original disclosure.

DETAILED DESCRIPTION OF EMBODIMENTS

Figure 1:
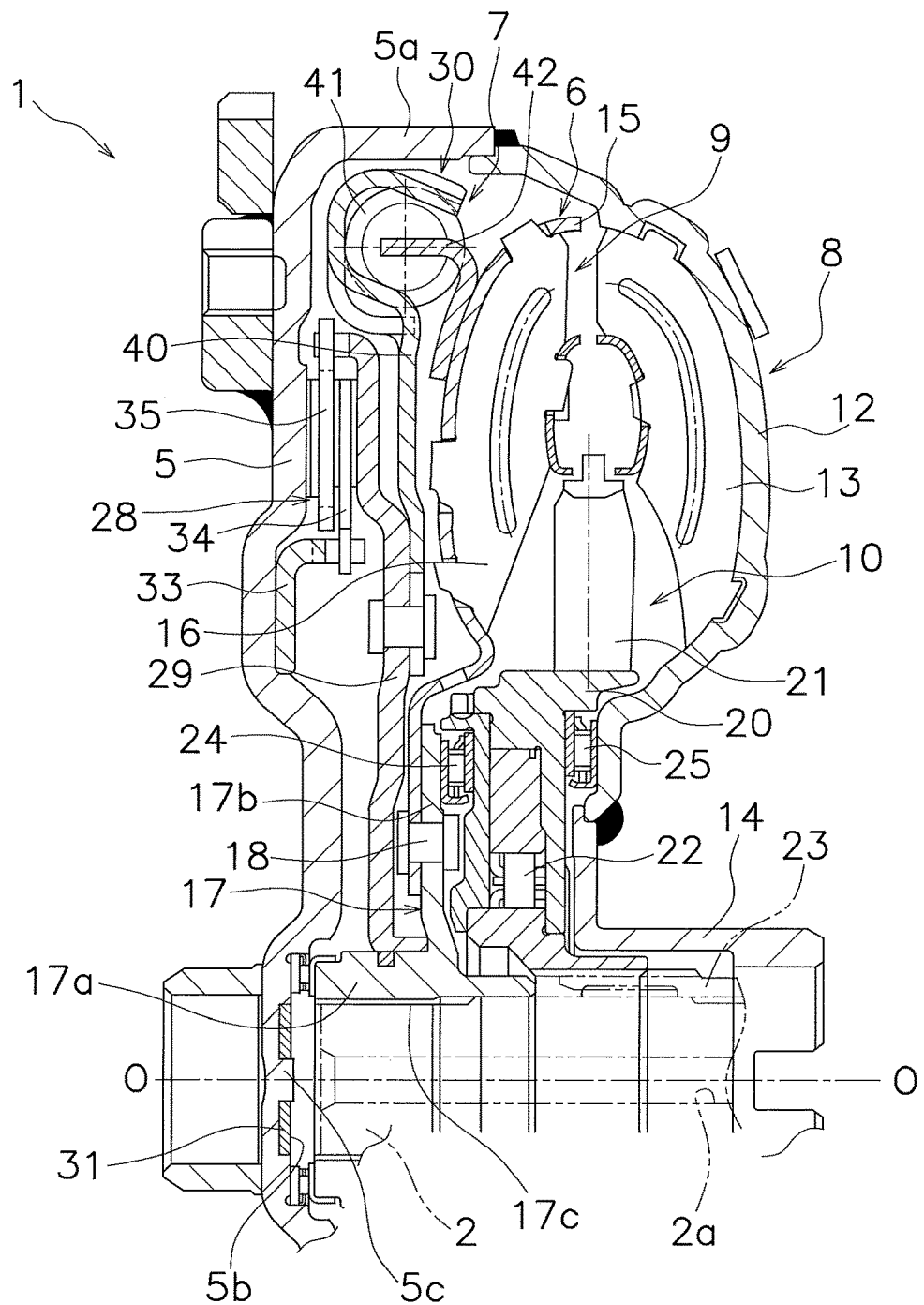
FIG. 1 is a cross-sectional view of a torque converter including a lock-up device according to a preferred embodiment of the present disclosure.

FIG. 1 is a partial cross-sectional view of a torque converter 1 including a lock-up device according to a preferred embodiment of the present disclosure. In FIG. 1, an engine (not shown in the drawing) is disposed on the left side whereas a transmission (not shown in the drawing) is disposed on the right side. It should be noted that line O-O depicted in FIG. 1 indicates a common rotational axis for the torque converter 1 and the lock-up device. It should be also noted that in the following explanation, the term "radial direction" refers to a direction separating from the rotational axis whereas the term "axial direction" refers to a direction arranged along the rotational axis.

(Entire Construction of Torque Converter 1)

The torque converter 1 is a device that transmits a torque from an engine-side crankshaft (not shown in the drawings) to an input shaft 2 of the transmission. As shown in FIG. 1, the torque converter 1 is composed of a front cover 5, a torque converter body 6 and a lock-up device 7. It should be noted that the input shaft 2 of the transmission is provided with an oil drain channel 2a in its interior. The oil drain channel 2a is a discharge channel that returns the hydraulic oil from the torque converter 1 to a hydraulic oil tank.

The front cover 5 is fixed to an input-side member. The front cover 5 is a substantially disc-shaped member, and its outer peripheral part protrudes toward the transmission as an outer peripheral tubular part 5a.

The torque converter body 6 is composed of three types of bladed wheels (an impeller 8, a turbine 9 and a stator 10).

The impeller 8 is composed of an impeller shell 12, a plurality of impeller blades 13 and an impeller hub 14. The impeller shell 12 is fixed at its outer peripheral part to the outer peripheral tubular part 5a of the front cover 5 by welding. The impeller blades 13 are fixed to the inside of the impeller shell 12. The impeller hub 14 has a tubular shape and is fixed to the inner peripheral part of the impeller shell 12.

The turbine 9 is disposed in opposition to the impeller 8. The turbine 9 is composed of a turbine shell 15, a plurality of turbine blades 16 and a turbine hub 17. The turbine blades 16 are fixed to the inside of the turbine shell 15. The turbine hub 17 is fixed to the inner peripheral part of the turbine shell 15. The turbine hub 17 includes a tubular part 17a and a flange 17b. The tubular part 17a extends in the axial direction. The flange 17b extends radially outside from the tubular part 17a. The inner peripheral part of the turbine shell 15 is fixed to the flange 17a by a plurality of rivets 18. Additionally, the turbine hub 17 is provided with a spline hole 17c in its inner peripheral part. The spline hole is engaged with the input shaft 2 of the transmission.

The stator 10 is disposed between the inner peripheral part of the impeller 8 and that of the turbine 9. The stator 10 regulates the flow of hydraulic oil returning from the turbine 9 to the impeller 8. The stator 10 is mainly composed of a stator carrier 20 and a plurality of stator blades 21 mounted to the outer peripheral surface of the stator carrier 20. The stator carrier 20 is supported by a stationary shaft 23 through a one-way clutch 22. It should be noted that thrust bearings 24 and 25 are disposed axially on both sides of the stator carrier 20.

(Lock-Up Device 7)

Figure 2:
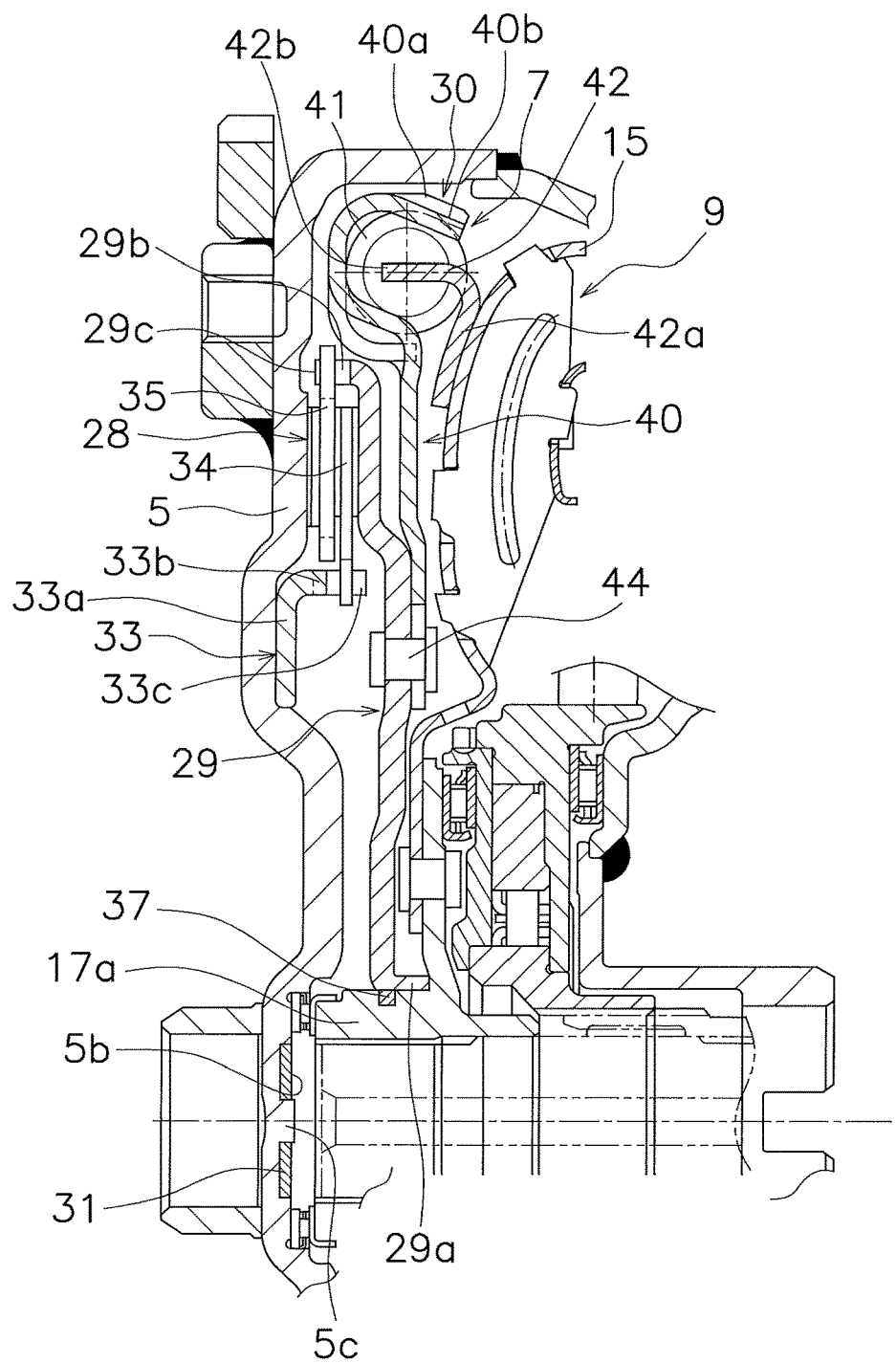
FIG. 2 is a diagram showing the lock-up device extracted from FIG. 1.

As shown in FIGS. 1 and 2, the lock-up device 7 is disposed in a space between the front cover 5 and the turbine 9. The lock-up device 7 includes a clutch portion 28, a piston 29, a damper portion 30 and a hydraulic oil leasing-out plate 31.

<Clutch Portion 28>

As shown in FIGS. 1 and 2, the clutch portion 28 includes a drive plate 33, a first clutch plate 34 and a second clutch plate 35.

The drive plate 33 includes a fixation part 33a having a disc shape and a tubular part 33b. The fixation part 33a is fixed to a radially intermediate part of the turbine 9-side lateral surface of the front cover 5 by welding. The tubular part 33b is formed by bending a part located on the outer peripheral side of the fixation part 33a toward the turbine 9. The tubular part 33b is provided with a plurality of grooves 33c. The grooves 33c extend in the axial direction while being aligned at predetermined intervals in the circumferential direction.

The first clutch plate 34 is disposed axially between the front cover 5 and the piston 29. The first clutch plate 34 has a disc shape and includes a plurality of teeth on its inner peripheral part. The teeth are designed to be engaged with the grooves 33c of the drive plate 33. With this construction, the first clutch plate 34 is non-rotatable relatively to the drive plate 33 but is movable in the axial direction. Additionally, a pair of friction members is fixed to both surfaces of the first clutch plate 34.

The second clutch plate 35 is disposed axially between the front cover 5 and the first clutch plate 34. The second clutch plate 35 has a disc shape and includes a plurality of teeth on its outer peripheral part. The teeth are aligned at predetermined intervals in the circumferential direction. Additionally, a friction member is fixed to the front cover 5-side surface of the second clutch plate 35.

It should be noted that for a lubrication purpose, the friction members fixed to the first clutch plate 34 and the second clutch plate 35 are each provided with a plurality of grooves penetrating therethrough from the inner peripheral side to the outer peripheral side. The hydraulic oil flows through the lubricating grooves from the inner peripheral side to the outer peripheral side of the clutch portion 28 or vice versa. Thus, the friction members are lubricated by the hydraulic oil, and their abrasion can be inhibited.

<Piston 29>

The piston 29 is a disc-shaped plate member disposed axially between the front cover 5 and the turbine 9. The inner peripheral end of the piston 29 is bent toward the turbine 9 and is formed as an inner peripheral tubular part 29a. The inner peripheral tubular part 29a is axially movable while being supported by the outer peripheral surface of the tubular part 17a of the turbine hub 17. Additionally, the outer peripheral end of the piston 29 is bent toward the front cover 5 and is formed as an outer peripheral tubular part 29b. The outer peripheral tubular part 29b is provided with a plurality of grooves 29c. The grooves 29c extend in the axial direction while being aligned at predetermined intervals in the circumferential direction. The grooves 29c are meshed with the teeth provided on the outer peripheral part of the second clutch plate 35. With this construction, the second clutch plate 35 is non-rotatable relatively to the piston 29 but is movable in the axial direction.

It should be noted that a seal member 37 is disposed on the outer peripheral surface of the tubular part 17a of the turbine hub 17. The seal member 37 seals between the inner peripheral end surface of the piston 29 and the outer peripheral surface of the tubular part 17a of the turbine hub 17.

<Damper Portion 30>

The damper portion 30 absorbs and attenuates fluctuation in torque inputted thereto from the front cover 5 through the clutch portion 28 and the piston 29. As shown in FIGS. 1 and 2, the damper portion 30 includes a retaining plate 40, torsion springs 41 and a driven plate 42.

The retaining plate 40 has a disc shape and is disposed axially between the piston 29 and the turbine 9. The inner peripheral end of the retaining plate 40 is fixed to the radially intermediate part of the piston 29 by rivets 44. Additionally, the retaining plate 40 is provided with a plurality of accommodation parts 40a and a plurality of engaging parts 40b in its outer peripheral part. The plural accommodation parts 40a are disposed in circumferential alignment and each accommodates each of the torsion springs 41. Additionally, each accommodation part 40a is provided with the engaging parts 40b on its both circumferential ends. The engaging parts 40b are capable of being engaged with both circumferential ends of each torsion spring 41.

The driven plate 42 includes a fixation part 42a having an annular shape and a plurality of engaging parts 42b. The fixation part 42a is fixed to the outer peripheral surface of the turbine shell 15 by welding. Additionally, the plural engaging parts 42b extend from the outer peripheral end of the fixation part 42a toward the front cover 5. Moreover, the engaging parts 42b are capable of being engaged with both circumferential ends of the torsion springs 41.

<Hydraulic Oil Leading-Out Plate 31>

The hydraulic oil leading-out plate 31 is mounted to the center part of the front cover 5. When described in more detail, a recess 5b is provided on the center part of the front cover 5 so as to be opposed to the tip surface of the input shaft 2 of the transmission. The recess 5b has an annular shape, and hence, the recess 5b is provided with a protrusion 5c on its center (in other words, the protrusion 5c is left unprocessed). Additionally, the hydraulic oil leading-out plate 31 is attached to the recess 5b, and then, the tip of the protrusion 5c is pressed and deformed. Thus, the hydraulic oil leading-out plate 31 is fixed thereto by swaging. It should be noted that the hydraulic oil leading-out plate 31 has a thickness equivalent to or less than the depth of the recess 5b. Therefore, the surface of the hydraulic oil leading-out plate 31 does not axially protrude from the surface of the front cover 5.

Figure 3:
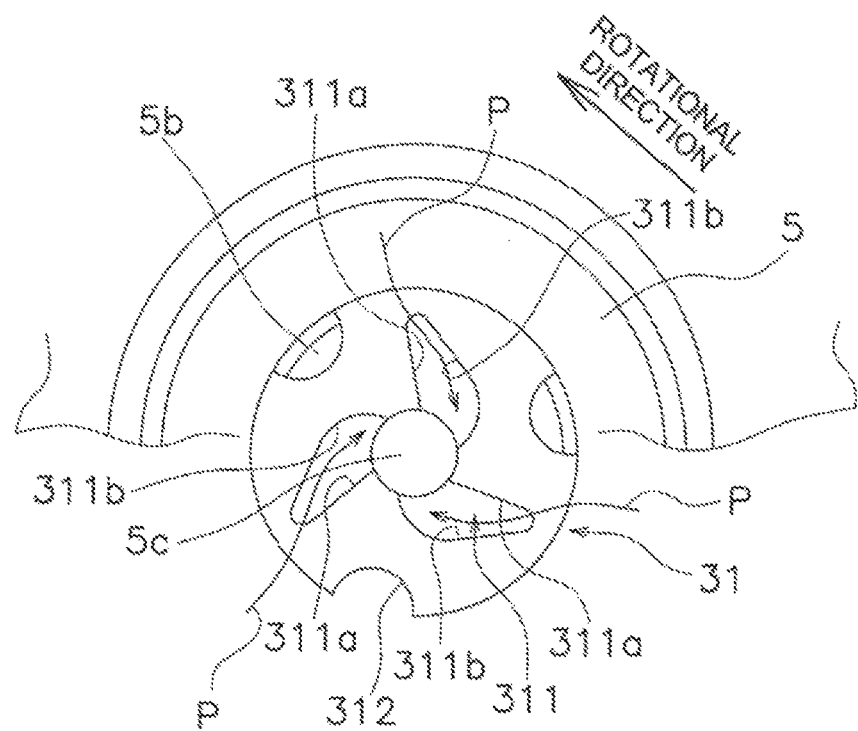
FIG. 3 is a front view of a hydraulic oil leading-out plate.

As shown in FIG. 3, the hydraulic oil leading-out plate 31 includes three elongated holes 311 and three cutouts 312. The elongated holes 311 extend radially outside from the center part of the hydraulic oil leading-out plate 31. The cutouts 312 are provided on the outer peripheral part of the hydraulic oil leading-out plate 31. The three elongated holes 311 axially penetrate the hydraulic oil leading-out plate 31 and are aligned at equal angular intervals. The elongated holes 311 have the same shape. On the other hand, each of the cutouts 312 is located circumferentially between adjacent two of the elongated holes 311. Each cutout 312 is made in the shape of a circular arc that recesses to the inner peripheral side.

Each elongated hole 311 includes a first edge 311a and a second edge 311b. The first edge 311a extends from a rotational center in an approximately radial direction. The second edge 311b is provided on a side opposed to the first edge 311a. In focusing on one elongated hole 311, the first edge 311a is located downstream in a rotational direction, whereas the second edge 311b is located upstream in the rotational direction. Additionally, the second edge 311b extends to gradually separate from the first edge 311a to the inner peripheral side. In other words, the width of the elongated hole 311 gradually increases to the inner peripheral side. Additionally, the inner peripheral part of the second edge 311b has a circular-arc shape and its tip extends approximately toward the rotational center.

(Actions)

First, the flow of the hydraulic oil will be explained. The hydraulic oil is supplied to the interior of the torque converter body 6 from the inner peripheral part of the torque converter body 6 (i.e., from the outer peripheral part of the input shaft 2 of the transmission and so forth) through the thrust bearings 24 and 25. The hydraulic oil flows from the outer peripheral side of the torque converter body 6 toward the lock-up device 7, and then flows into the space between the front cover 5 and the piston 29 through the clutch portion 28. Subsequently, the hydraulic oil flows into between the front cover 5 and the tip surface of the input shaft 2, and is returned to the hydraulic oil tank through the oil drain channel 2a provided in the interior of the input shaft 2.

In the lock-up state (that a torque is not being transmitted by the clutch portion 28), the hydraulic pressure on the front cover 5 side of the piston 29 (releasing pressure) is equivalent to or higher than the hydraulic pressure on the turbine 9 side of the piston 29 (applying pressure). Therefore, the piston 29 is not pressing the clutch portion 28.

In this case, the hydraulic oil inside the torque converter body 6 flows from the impeller 8 to the turbine 9 and further flows to the impeller 8 through the stator 10. Accordingly, a torque is transmitted from the impeller 8 to the turbine 9 through the hydraulic oil. The torque transmitted to the turbine 9 is then transmitted to the input shaft 2 of the transmission through the turbine hub 17.

When the speed ratio of the torque converter 1 increases and the rotational velocity of the input shaft 2 reaches a predetermined value, the oil drain channel 2a of the input shaft 2 is connected to the hydraulic oil tank. Therefore, the releasing pressure, which is the hydraulic pressure in the space between the front cover 5 and the piston 29, becomes lower than the applying pressure. Accordingly, the piston 29 is moved toward the front cover 5, and presses the clutch portion 28. Thus, the first clutch plate 34 and the second clutch plate 35 are interposed and held between the front cover 5 and the piston 29, whereby the lock-up state (that a torque is being transmitted by the clutch portion 28) is made.

In this case, the torque inputted into the front cover 5 is transmitted from the drive plate 33 to the piston 29 through the clutch portion 28. The torque transmitted to the piston 29 is transmitted to the torsion springs 41 through the retaining plate 40, and is further transmitted to the turbine 9 through the driven plate 42. Then, the torque transmitted to the turbine 9 is transmitted to the input shaft 2 of the transmission.

Figure 4:
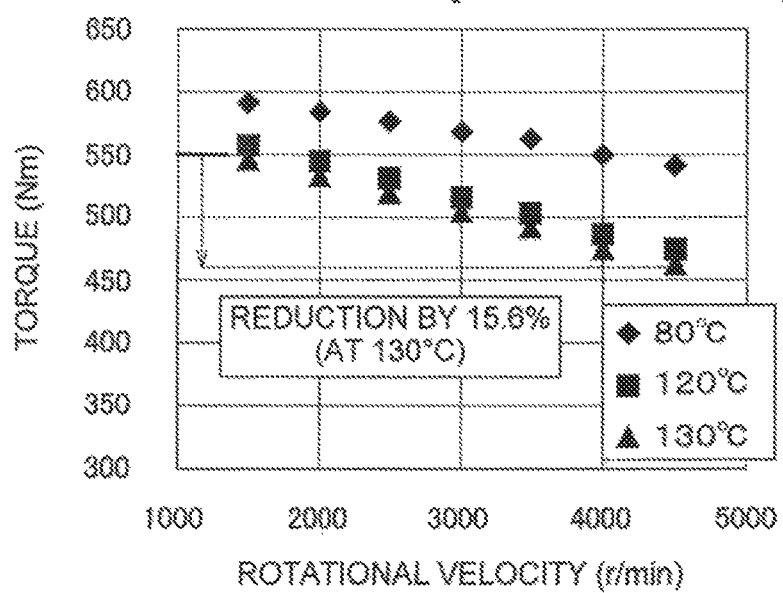
FIG. 4 is a chart showing reduction in lock-up capacity when the hydraulic oil leading-out plate is not provided.

As shown in FIG. 4, when a well-known structure without the hydraulic oil leading-out plate 31 is in the lock-up state described above, torque transmission capacity (i.e., lock-up capacity) reduces with increase in rotational velocity of the engine. Especially, when the temperature of the hydraulic oil is high (130 degrees Celsius in FIG. 4), the reduction rate of the lock-up capacity is high, and the lock-up capacity at a rotational velocity of 4500 rpm is reduced by 15.6% from that at a rotational velocity of 1500 rpm.

By contrast, when the hydraulic oil leading-out plate 31 is provided as with the present preferred embodiment, the hydraulic oil residing between the front cover 5 and the piston 29 is led to the oil drain channel 2a of the input shaft 2 in accordance with rotation of the front cover 5 (the hydraulic oil leading-out plate 31). When described in more detail, the hydraulic oil residing between the front cover 5 and the piston 29 is scooped by the second edges 311b of the elongated holes 311, and is guided to flow from the outer peripheral side to the inner peripheral side. In other words, the hydraulic oil is gathered to the tip surface of the input shaft 2 of the transmission on the center part of the front cover 5, and is then led to the oil drain channel 2a of the input shaft 2. Then, the hydraulic oil is discharged to the hydraulic oil tank through the oil drain channel 2a.

As described above, the hydraulic oil residing in the space between the front cover 5 and the piston 29 is forcibly led to the oil drain channel 2a by the function of the hydraulic oil leading-out plate 31. Therefore, the releasing pressure gets lower, and in other words, difference between the applying pressure and the releasing pressure increases. Accordingly, reduction in pressing force of the piston 29 against the clutch portion 28 can be inhibited.

Figure 5:
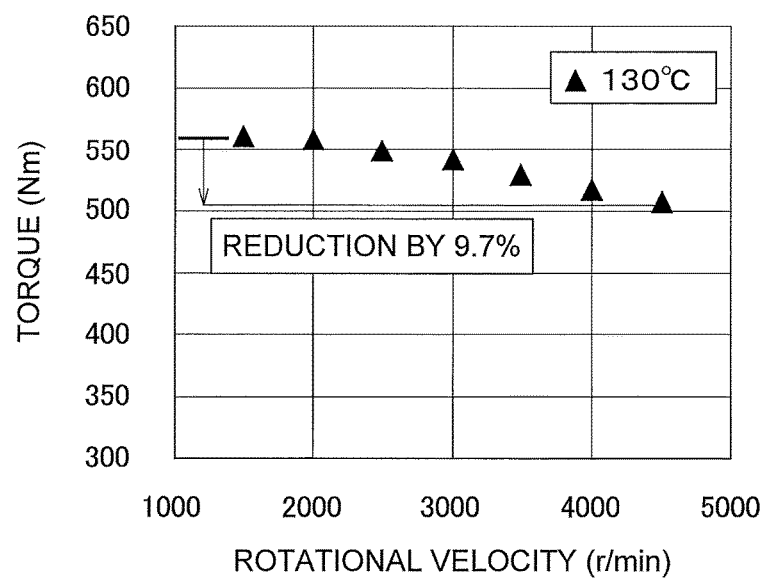
FIG. 5 is a chart showing reduction in lock-up capacity when the hydraulic oil leading-out plate is provided.

FIG. 5 shows measurements of reduction in lock-up capacity when the hydraulic oil leading-out plate 31 is provided. As shown in FIG. 5, when the temperature of the hydraulic oil is 130 degrees Celsius, the lock-up capacity at a rotational velocity of 4500 rpm is only reduced by 9.7% from that at a rotational velocity of 1500 rpm. In other words, FIG. 5 reveals that the reduction rate in lock-up capacity is improved by 5.9% compared to that of the well-known product shown in FIG. 4.

It should be noted that when the torque converter 1 according to the present preferred embodiment is assembled to the transmission, the input shaft 2 of the transmission has chances of being located more forward than its position illustrated in FIGS. 1 and 2 (i.e., a post-assemblage position) in an intermediate step of the assemblage process.

In view of the above, the hydraulic oil leading-out plate 31 in the present preferred embodiment is mounted to the recess 5b of the front cover 5 without protruding therefrom. Specifically, the hydraulic oil leading-out plate 31 does not protrude beyond the surface of the front cover 5 that is opposed to the tip surface of the input shaft 2. Therefore, it is possible to prevent that the tip of the input shaft 2 collides with the hydraulic oil leading-out plate 31 in the assemblage process whereby the assemblage process is made difficult or the hydraulic oil leading-out plate 31 is damaged.

Other Exemplary Embodiments

The present disclosure is not limited to the aforementioned preferred embodiment, and a variety of changes or modifications can be made without departing from the scope of the present disclosure.

(a) The shape, the size and the attachment position of the hydraulic oil leading-out plate are not necessarily limited to those described in the aforementioned preferred embodiment. Likewise, the shape of the elongated holes provided in the hydraulic oil leading-out plate is not limited to that described in the aforementioned preferred embodiment.

Figure 6:
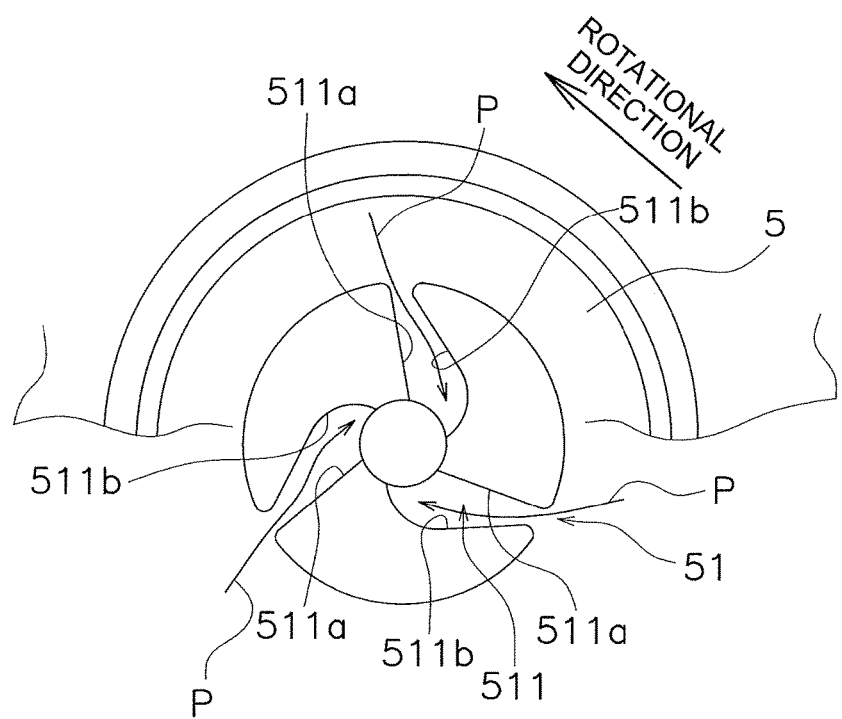
FIG. 6 is a diagram showing a hydraulic oil leading-out plate according to another preferred embodiment.

(b) FIG. 6 shows a hydraulic oil leading-out plate according to another preferred embodiment. Similarly to the hydraulic oil leading-out plate 31 according to the aforementioned preferred embodiment, a hydraulic oil leading-out plate 51 according to the present preferred embodiment is mounted to the annular recess 5b provided on the center part of the front cover 5. Additionally, similarly to the hydraulic oil leading-out plate 31, the hydraulic oil leading-out plate 51 also has a thickness equivalent to or less than the depth of the recess 5b.

The hydraulic oil leading-out plate 51 is provided with three elongated grooves 511 extending radially outside from its inner peripheral part. The three elongated grooves 511 axially penetrate the hydraulic oil leading-out plate 51 and are aligned at equal angular intervals. The elongated grooves 511 have the same shape. Additionally, the outer peripheral ends of the elongated grooves 511 are opened.

Each elongated groove 511 includes a first edge 511a and a second edge 511b. The first edge 511a extends from a rotational center in an approximately radial direction. The second edge 511b is provided on a side opposed to the first edge 511a. In focusing on one elongated groove 511, the first edge 511a is located downstream in a rotational direction, whereas the second edge 511b is located upstream in the rotational direction. Additionally, the second edge 511b extends to gradually separate from the first edge 511a to the inner peripheral side. In other words, the width of the elongated groove 511 gradually increases to the inner peripheral side. Additionally, the inner peripheral part of the second edge 511b has a circular-arc shape and its tip extends approximately toward the rotational center.

The hydraulic oil leading-out plate 51 constructed as described above can also achieve advantageous effects similar to those achieved by the hydraulic oil leading-out plate 31 of the aforementioned preferred embodiment.

(c) In the aforementioned preferred embodiment, the front cover 5 is provided with the recess 5b, and the hydraulic oil leading-out plate 31 is mounted to the recess 5b. However, the front cover 5 may be provided with recesses playing the same role as the elongated holes 311 of the hydraulic oil leading-out plate 31.

(d) In the aforementioned preferred embodiment, the present disclosure is applied to the so-called two-port torque converter. However, the present disclosure is also similarly applicable to a torque converter having another construction (e.g., a three-port torque converter).

(e) In the aforementioned preferred embodiment, the present disclosure is applied to a type of lock-up device including a multi-plate clutch portion. However, the present disclosure is also similarly applicable to a type of lock-up device including a single-plate clutch portion.

In the aforementioned preferred embodiment, the hydraulic oil leading-out plate 31, 51 is fixed to the recess 5b of the front cover 5 such that the surface of the hydraulic oil leading-out plate 31, 51 does not protrude beyond that of the front cover 5. However, when there is no risk of interference between the hydraulic oil leading-out plate 31, 51 and the input shaft 2 of the transmission in assemblage of the input shaft 2 to the torque converter 1, the hydraulic oil leading-out plate 31, 51 may be fixed to the front cover 5 while protruding beyond the surface of the front cover 5.

What is claimed is:

1. A lock-up device for a torque converter, the lock-up device for transmitting a torque from a front cover to an input shaft of a transmission, the lock-up device comprising:
    a clutch portion disposed between the front cover and a turbine, the clutch portion including at least one clutch plate;
    a piston disposed to be axially movable, the piston for pressing the at least one clutch plate toward the front cover so as to turn the clutch portion into a torque transmitting state; and
    a hydraulic oil leading-out means for leading a hydraulic oil that resides between the front cover and the piston to an oil discharge channel provided in the input shaft of the transmission by utilizing rotation of the front cover, wherein the hydraulic oil leading-out means is a plate member fixed to a center part of the front cover, the plate member including a leading-out part for leading the hydraulic oil to the oil discharge channel, the plate member includes a plurality of holes axially penetrating therethrough, from a center part of the plate member, as the leading-out part, the plurality of holes radially extending outward from the center part of the plate member, the hydraulic oil leading-out means mounted to a piston-side lateral surface of the front cover, and
    the hydraulic oil is taken into the plurality of holes and is led to the oil discharge channel in conjunction with the rotation of the front cover.

2. The lock-up device according to claim 1, wherein the hydraulic oil leading-out means is mounted to the center part of the front cover in opposition to a tip surface of the input shaft of the transmission.

3. The lock-up device according to claim 2, wherein
    the front cover includes a recess, the recess provided on the piston-side lateral surface of the front cover in opposition to the tip surface of the input shaft of the transmission, and
    the plate member is disposed in the recess such that a surface thereof opposed to the input shaft does not protrude beyond the piston-side lateral surface of the front cover.

4. The lock-up device according to claim 1, wherein the torque converter includes
    a torque converter body including an impeller, the turbine and a stator, and
    a hydraulic oil supply channel for supplying the hydraulic oil from an inner peripheral part of the torque converter body to a space disposed on a transmission side of the piston, the space including the torque converter body.

5. The lock-up device according to claim 1, wherein
    the clutch portion includes at least one first clutch plate, at least one second clutch plate and a plurality of friction members, the plurality of friction members fixed to the first clutch plate or the second clutch plate, and each of the plurality of friction members includes a groove provided thereon to penetrate therethrough from an outer peripheral side to an inner peripheral side.

6. A lock-up device for a torque converter, the lock-up device for transmitting a torque from a front cover to an input shaft of a transmission, the lock-up device comprising:
   a clutch portion disposed between the front cover and a turbine, the clutch portion including at least one clutch plate;
   a piston disposed to be axially movable, the piston for pressing the at least one clutch plate toward the front cover so as to turn the clutch portion into a torque transmitting state; and
   hydraulic oil leading-out means for leading a hydraulic oil that resides between the front cover and the piston to an oil discharge channel provided in the input shaft of the transmission by utilizing rotation of the front cover, wherein the hydraulic oil leading-out means is a plate member fixed to a center part of the front cover, the plate member including a leading-out part for leading the hydraulic oil to the oil discharge channel, the plate member includes a plurality of elongated grooves axially penetrating therethrough, from a center part of the plate member, as the leading-out part, the plurality of elongated grooves radially extending outward from an inner peripheral part of the plate member, the plurality of elongated grooves opened to an outer peripheral side, the hydraulic oil leading-out means mounted to a piston-side lateral surface of the front cover, and
   the hydraulic oil is taken into the plurality of elongated grooves and is led to the oil discharge channel in conjunction with the rotation of the front cover.

\* \* \* \* \*